Aug. 10, 1926.

B. E. CARRM 1,595,449

DISPLAY APPARATUS

Filed Jan. 2, 1925    5 Sheets-Sheet 1

Inventor
Bazil E. Carrm
by Conrad A. Dieterich
his Atty

Aug. 10, 1926.

B. E. CARRM

DISPLAY APPARATUS

Filed Jan. 2, 1925

Aug. 10, 1926.  
B. E. CARRM  
DISPLAY APPARATUS  
Filed Jan. 2, 1925  
1,595,449  
5 Sheets-Sheet 3

Inventor;
Bazel E. Carrm
by Conrad H. Nelind
his Atty

Aug. 10, 1926.
B. E. CARRM
DISPLAY APPARATUS
Filed Jan. 2, 1925   5 Sheets-Sheet 4
1,595,449
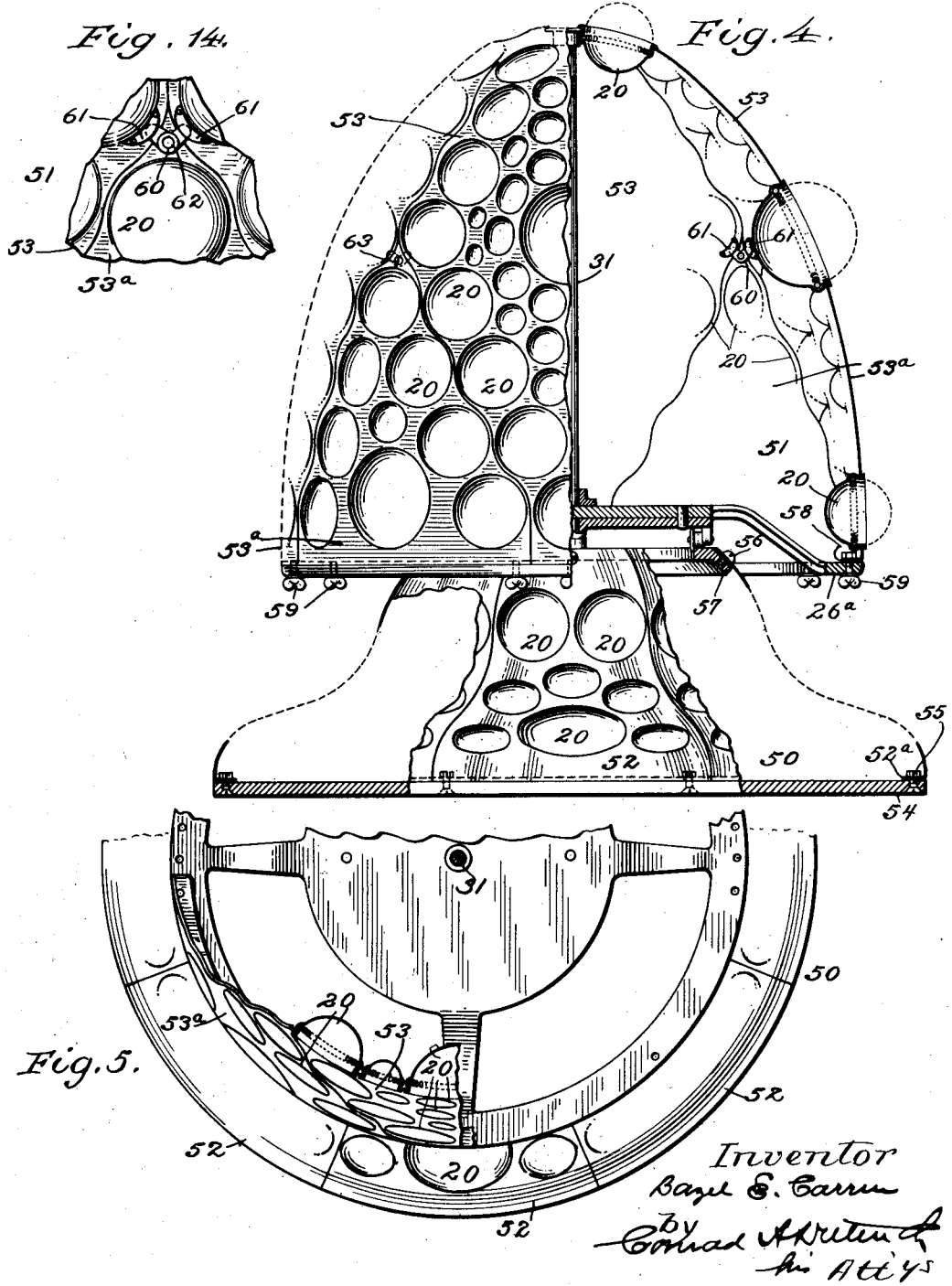

Aug. 10, 1926.

B. E. CARRM 1,595,449

DISPLAY APPARATUS

Filed Jan. 2, 1925  5 Sheets-Sheet 5

Inventor:
Bazel E. Carrm
By Conrad A. Dreher
his Atty

Patented Aug. 10, 1926.

1,595,449

UNITED STATES PATENT OFFICE.

BAZEL E. CARRM, OF NEW YORK, N. Y.

DISPLAY APPARATUS.

Application filed January 2, 1925. Serial No. 22.

My invention relates to improvements in display apparatus, and the same has for its object more particularly to provide an apparatus for displaying fruit or other objects in an attractive or ornamental form.

Further, said invention has for its object to provide an apparatus by means of which a number of pieces of fruit may be displayed in a variety of forms of symmetrical or ornamental design.

Further, said invention has for its object to provide a display device by means of which individual units or objects of different sizes may be combined and displayed in a symmetrical manner or form.

Further, said invention has for its object to provide a display apparatus comprising a holder having means arranged thereon for receiving and holding a number of units or elements, in such manner that the same may readily be inserted or removed, at will.

Further, said invention has for its object to provide a display apparatus comprising a support having a plurality of pockets therein, and means for frictionally holding the elements to be displayed in position within said pockets.

Further, said invention has for its object to provide a display apparatus comprising a support composed of a plurality of conforming parts or sections adapted to be secured together to form a complete support of any desired shape or form, and each section provided with means to receive and hold a number of elements or units in position thereon.

Other objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings—

Fig. 4 is a side view partly in section and broken away showing a modified form of support;

Fig. 5 is a top view partly broken away;

Fig. 6 is an enlarged detail section showing one of the individual holders;

Fig. 7 is a similar view showing the parts in separated relation;

Fig. 8 is an enlarged rear view partly broken out showing a portion of the inner side of the support and the individual holders therein;

Fig. 14 is an enlarged detail face view showing the manner of securing the hollow support sections in place.

Figure 1:
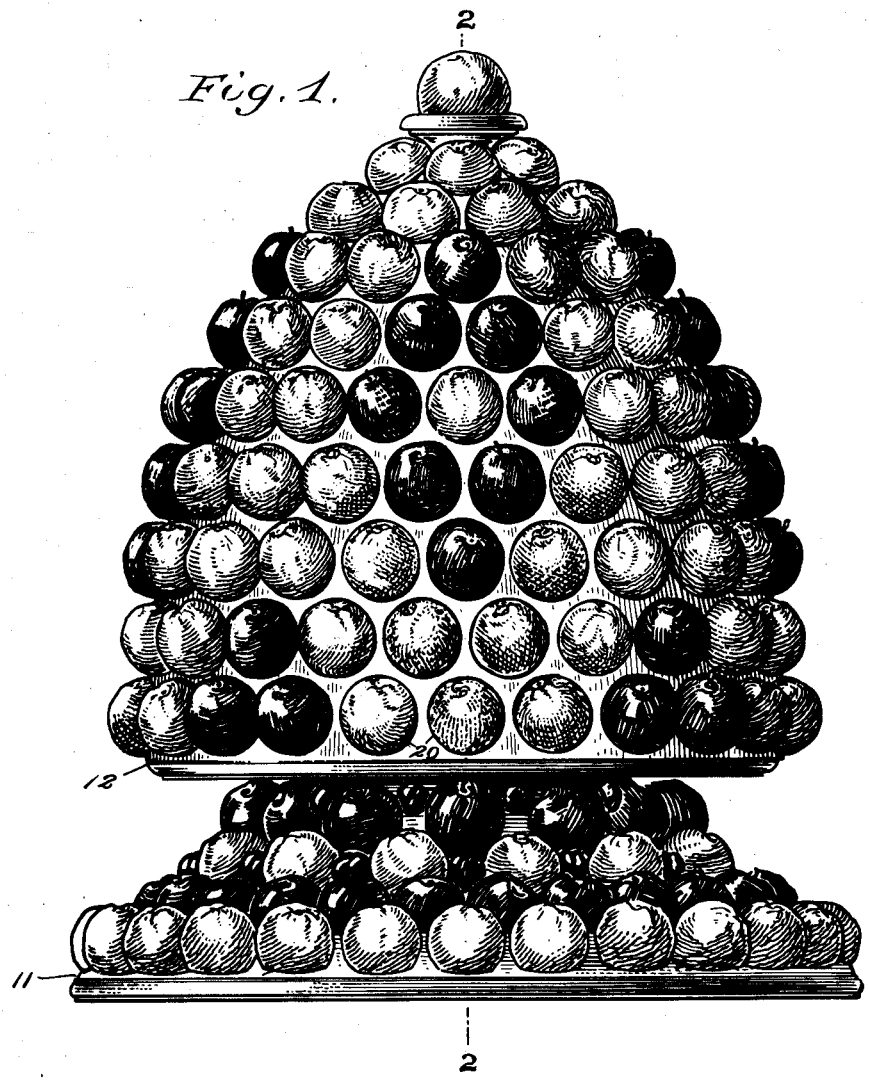
Figure 1 is a side view showing one form of display apparatus constructed according to and embodying my said invention.
Figure 2:
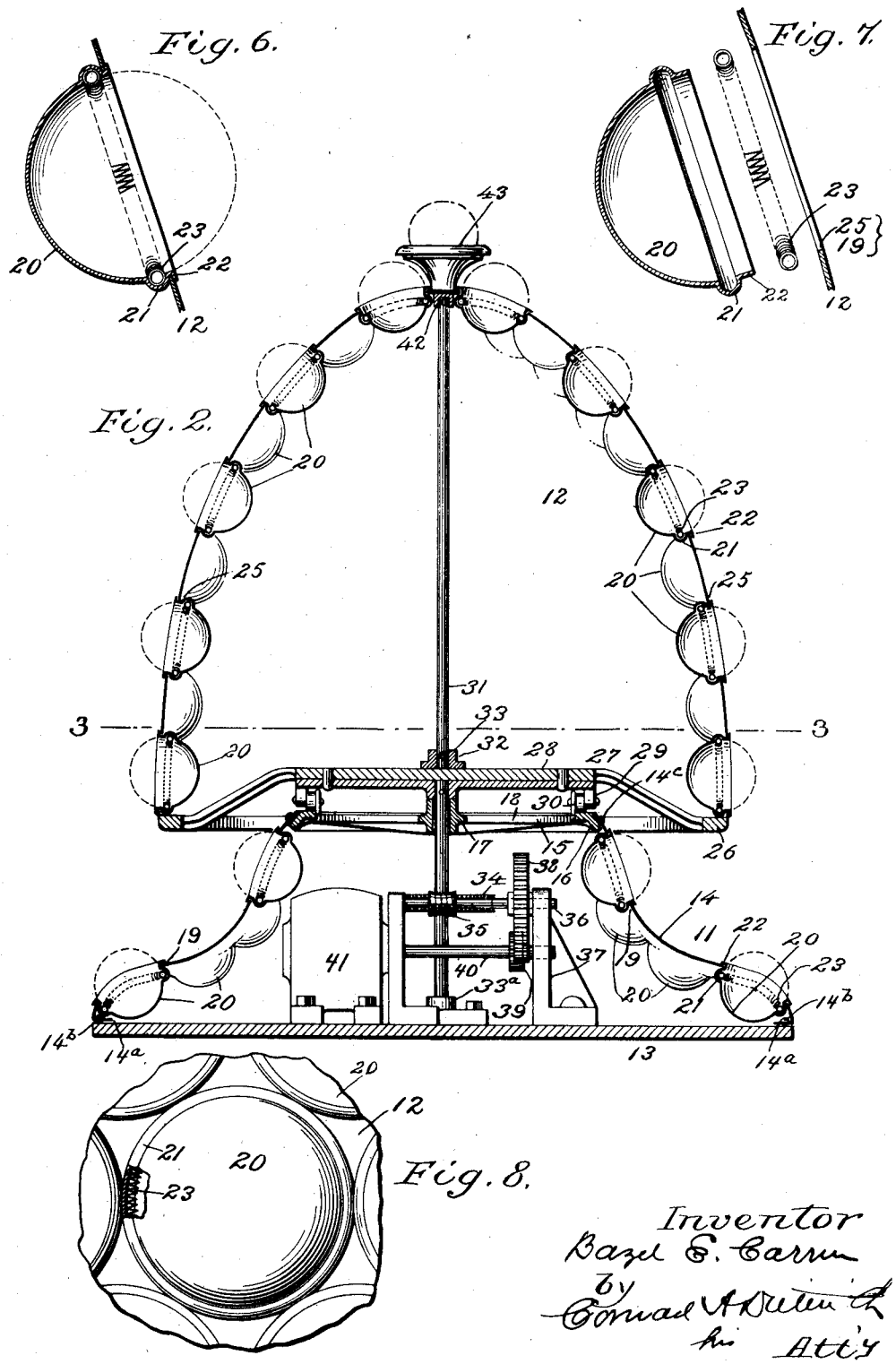
Fig. 2 is a central vertical section taken essentially on the line 2—2 of Fig. 1.
Figure 3:
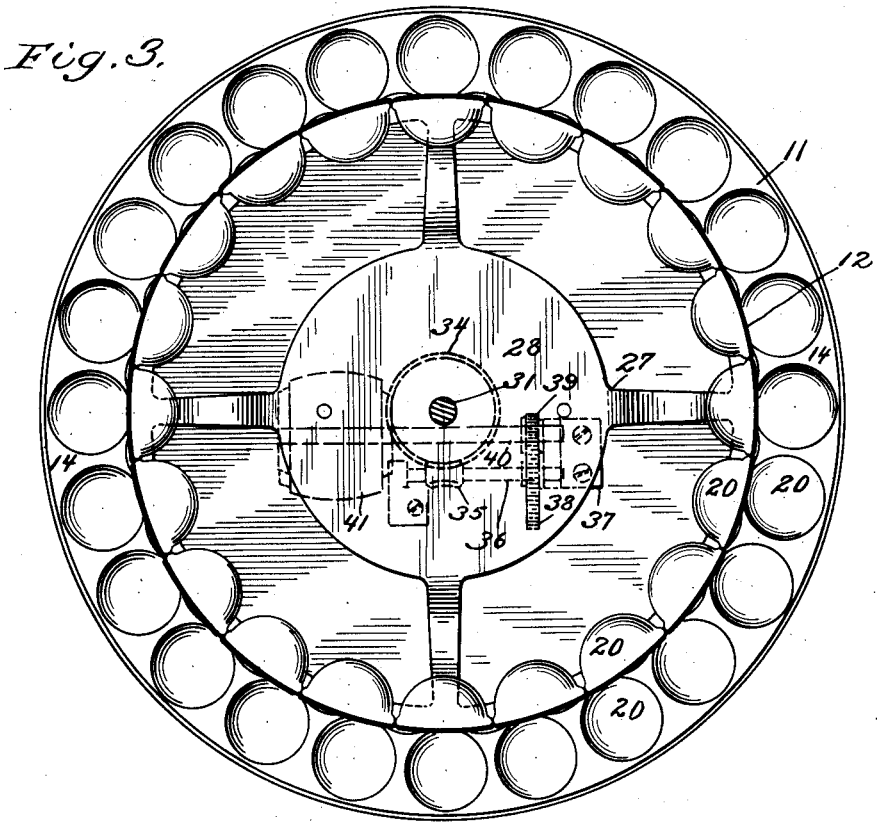
Fig. 3 is a horizontal section taken on the line 3—3 of Fig. 2.

In said drawings, the apparatus is shown as comprising a hollow base 11, and a hollow support 12 rotatably mounted with respect to the base 11. The base 11 comprises a bottom plate 13 upon which is disposed a shell 14, preferably made of sheet metal or other suitable material, and of any desired ornamental outline. The shell 14 is provided along its lower edge with an inwardly extending flange 14ª through which extend screws 14ᵇ for securing the shell to the upper side of the bottom 13, and at its upper edge said shell 14 is secured by screws 14ᶜ to a top frame or spider 15 comprising an annular member 16 supporting a central hub 17 by radial arms 18. The shell 14 is provided in its outer surface with a series of circular openings 19 arranged closely together. Within each circular opening 19 is disposed a substantially semispherical holder 20 provided adjacent to its outer edge with an annular recess or groove 21, and a flange 22 extending outwardly therefrom which is adapted to extend through the opening 19 and has the outer edge turned over, as shown at Fig. 6, to secure said holder in position within its opening. 23 denotes an annular coiled spring which is sprung into the annular groove 21 of the holder 20 and serves to engage with and frictionally hold a piece of fruit or other object in position within the holder 20.

The hollow support 12 consists of a shell, which may be of any desired shape or form but is herein shown as of substantially conical form made of sheet metal or other similar material similar to that of the shell 14 of the base, and provided with numerous adjacent apertures 25 within each of which is secured a holder 20 corresponding to the holders 20 secured within the shell 14. The lower edge of the shell 14 is suitably supported upon the outer edge of the annular rim 26 of a spider frame 27 having a flat central portion 28 from the under side of which extend bearings 29 having rollers 30 mounted therein working upon the horizontal portion of the annular rim 16 of the spider 15 which is rigid with the base 11. The circular member 28 is rigidly secured to a shaft 31 by a collar 32 and pin 33 extending therethrough.

The lower end of the shaft 31 is supported in a socket 33$^a$ mounted upon the bottom plate 13 and is provided adjacent to its lower end with a worm gear 34 meshing with a worm 35 mounted upon a shaft 36 supported in bearings 37 secured to the base plate 13. 38 denotes a large gear fixed upon the shaft 36 which meshes with a pinion 39 fixed upon the armature shaft 40 of an electric motor 41, also mounted upon said base plate 13. The outer end of the shaft 40 is supported in one of the bearings 37.

The upper end of the shaft 31 extends into a socket 42 secured centrally upon the inner side of the hollow support 12 and serves to maintain the said hollow support properly positioned with respect to the base 11.

Arranged centrally and extending upwardly from the apex of the casing 12 is a small flaring receptacle 43 adapted to receive and hold a piece of fruit or other object, which serves to finish the design.

Figure 9:
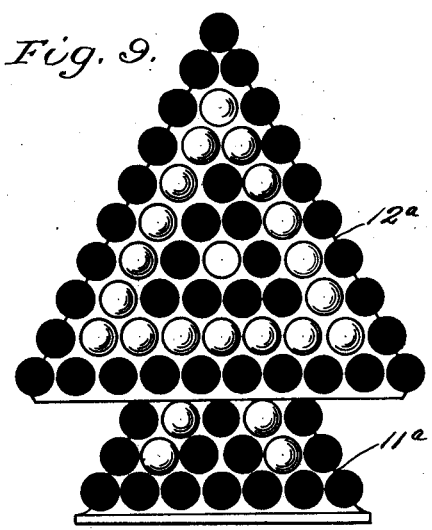
Fig. 9 is a side elevation showing a modified form of support.
Figure 10:
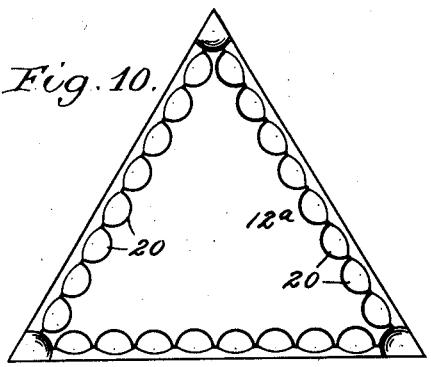
Fig. 10 is a plan or top view thereof.
Figure 11:
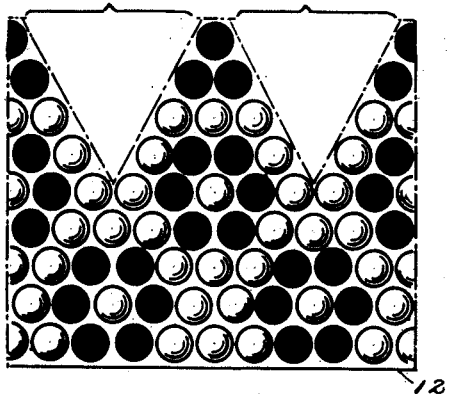
Figs. 11, 12 and 13 are diagrammatic views illustrating one half part of a support and showing several designs which may be produced thereon.
Figure 12:
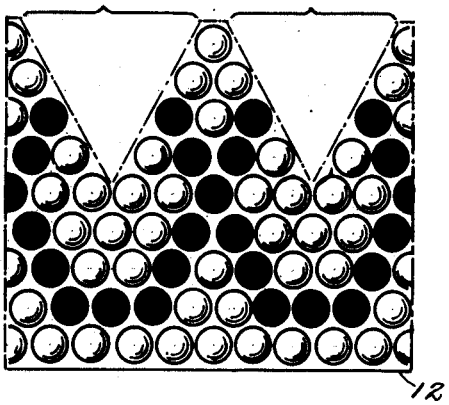
Figure 13:
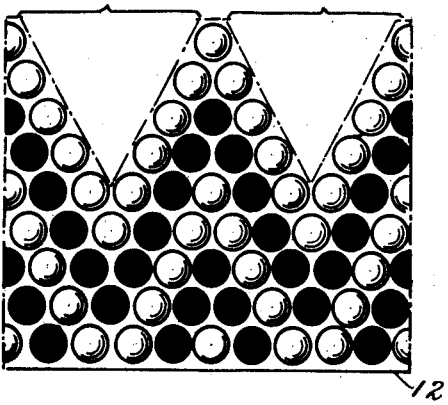

In the modification illustrated at Figs. 9 and 10, the base 11$^a$ may be of any suitable outline and constructed similarly to the base 11 described in Figs. 1 to 8 inclusive. Above said base 11$^a$ is rotatably mounted a hollow support 12$^a$ having the form of a flat-sided pyramid. The details of construction of the apparatus shown at Figs. 9 and 10 are essentially the same as those described in connection with the main Figures 1 to 8 inclusive.

In the modification illustrated at Figs. 4 and 5, both the base 50, and the hollow support 51, which is revolubly mounted with respect thereto, are severally formed of a plurality of sections 52, 53, respectively.

The base may be formed of any desired number of sections, but is here shown as composed of six sections 52 each of which is provided at its lower edge with an inwardly extending flange 52$^a$ adapted to be secured to the base plate 54 by bolts 55. The upper edges of said sections are adapted to be secured by screws 56 to the annular edge of a spider 57.

The hollow support 51 may also be composed of any desired number of sections 53, depending more or less upon the shape of said support. By preference, for the shape illustrated, it is here shown as composed of eight parts, four sections 53, which may for convenience be termed full parts, and four smaller parts 53$^a$, which may be termed half parts, and serve to fill the spaces between the separated edges of the full parts 53.

The lower edges of the parts 53 and 53$^a$ are each provided with an inwardly extending horizontal flange 58 adapted to be secured to the upper surface of an annular member 26$^a$, by thumb screws 59.

Certain of the sections 52, 53, 53$^a$ are provided upon their inner sides adjacent to their corners or edges with revoluble locking devices or clips 60 whose ends are adapted to engage with loops or retaining members 61 whereby to hold the several sections and parts of the hollow support 51 duly united.

In order to permit of the actuating of said locking devices 60 the head of each screw 62 thereof extends through its respective section, and has a slot 63 in its outer end or head to receive a tool by means of which the device may be rotated.

The operation of the apparatus will be largely obvious from the foregoing description. It is merely necessary to point out that the base 11 with the contained mechanism is stationary, while the shaft 31 and the hollow support 12 and the parts carried thereby are rotatable with respect to said base. The rotation of the upper support 12 being effected by the electric motor 41, shaft 40, pinion 39, gear 38, shaft 36, worm 35 which meshes with the worm gear 34 fixed upon the shaft 31. The shaft 31 extends loosely through the sleeve or hub 17 of the spider 15 and is fixed by pins 33 to the circular disc 28 of the spider 27 at the bottom of the hollow support.

It will, of course, be understood that the pockets or receptacles 20 herein shown are designed to receive fruit or analogous bodies having a substantially spherical form, and that in order to hold the said elements properly in position within said pockets, the same should be of a practically uniform size or diameter in order that the resilient members 23 may properly engage and frictionally hold each piece of fruit or other element duly in place within said pockets.

Further, it is to be noted that one of the features of my invention resides in the construction and arrangement of the pockets with respect to the support 12 and base 14 whereby it becomes possible to arrange fruit or other elements possessing different or contrasting colors in such a way as to form a large variety of ornamental designs, such, for example, as shown at Figs. 1, 9, and 11 to 13 inclusive.

Further, it is to be noted that by providing the hollow support with pockets of different sizes, as shown at Figs. 4 and 5, different kinds and sizes of fruit may be displayed, and the opportunity for producing designs in great color varieties accordingly increased.

Having thus described my said invention what I claim and desire to secure by Letters Patent is:—

1. An apparatus of the character described, comprising a hollow shell, a plurality of rows of openings extending around said shell, and separate receptacles disposed within said openings and serving to receive and retain therein, in exposed position, objects to be displayed; said openings and the receptacles therein being arranged closely together to permit of the formation of symmetrical designs with the objects to be displayed, substantially as specified.

2. An apparatus of the character described comprising a hollow shell having a plurality of openings therein distributed over the surface thereof, means disposed within each of said openings to receive and support the objects to be displayed in exposed position, partly within and partly without said openings, and means associated with each of said openings and directly engaging said objects to be displayed, and cooperating with said supporting means for retaining said objects in exposed position, substantially as described.

3. An apparatus of the character described comprising a hollow shell tapering upwardly, a plurality of rows of circular openings of substantially uniform diameter extending around said shell; said openings being arranged closely together with those of one row staggered relative to those of adjacent rows, and separate substantially semi-spherical members disposed within said openings, substantially as specified.

4. An apparatus of the character described comprising a supporting member, pockets in said member, and annular resilient means arranged within and adjacent to the edge of each of said pockets adapted to embrace and hold partly within and partly without said pockets the objects to be displayed therein, substantially as specified.

5. An apparatus of the character described comprising a base, a member revolubly mounted thereon, pockets in said member, and annular resilient means arranged within and adjacent to the edge of each of said pockets adapted to embrace and hold partly within and partly without said pockets the object to be displayed therein, substantially as specified.

6. An apparatus of the character described comprising a base, a member revolubly mounted thereon, pockets in said member, each having an annular recess therein adjacent to its edge, and an annular resilient member disposed within said annular recess adapted to embrace and hold partly within and partly without said pockets the object to be displayed, substantially as specified.

7. An apparatus of the character described comprising a base, a member revolubly mounted thereon, means for rotating said member, pockets in said member, each having an annular recess therein adjacent to its edge, and an endless coil spring disposed within said recess adapted to embrace and hold in position within said pockets the object to be displayed, substantially as specified.

8. An apparatus of the character described comprising a base, a member mounted thereon comprising a frame, a plurality of conforming sections, means for securing said sections together, and to said frame, pockets in said sections, and retaining means for each of said pockets adapted to engage and hold in position within said pockets the object to be displayed, substantially as specified.

9. An apparatus of the character described comprising a base composed of a bottom, a top frame, and a plurality of conforming sections secured to said bottom and top frame, a member revolubly mounted upon said base comprising a frame, a plurality of conforming sections secured upon said member, means for securing said sections together and to said frame, recesses in the sections of said base and said member revolubly mounted thereon, pockets secured in said recesses, and springs arranged severally in said pockets adjacent to the edges thereof to engage and hold in position within said pockets the objects to be displayed therein, substantially as specified.

10. An apparatus of the character described comprising a base composed of a bottom, a top frame, and a plurality of conforming sections secured to said bottom and top frame, a member revolubly mounted upon said base comprising a frame, a plurality of conforming sections secured upon said member, locking members on certain of said sections, and engageable members on adjacent sections adapted to be engaged by said locking members for securing said sections together and to said frame, recesses in the sections of said base and said member revolubly mounted thereon, pockets secured in said recesses, and springs arranged severally in said pockets adjacent to the edges thereof to engage and hold in position within said pockets the objects to be displayed therein, substantially as specified.

Signed at the city of New York, in the county and State of New York, this 16th day of May, one thousand nine hundred and twenty-two.

BAZEL E. CARRM.